US010145932B2

(12) United States Patent
Carmona et al.

(10) Patent No.: US 10,145,932 B2
(45) Date of Patent: Dec. 4, 2018

(54) METHOD FOR INSTRUMENTING A CONTAINER INTENDED TO BE SET MOVING IN PARTICULAR IN ORDER TO MIX AN ASSORTMENT OF MATERIALS

(71) Applicant: COMMISSARIAT A L'ENERGIE ATOMIQUE ET AUX ENERGIES ALTERNATIVES, Paris (FR)

(72) Inventors: Mikaël Carmona, Tencin (FR); Roland Blanpain, Entre-Deux-Guiers (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 693 days.

(21) Appl. No.: 14/316,452

(22) Filed: Jun. 26, 2014

(65) Prior Publication Data
US 2015/0003208 A1 Jan. 1, 2015

(30) Foreign Application Priority Data

Jun. 27, 2013 (FR) ..................................... 13 56180

(51) Int. Cl.
G01S 1/72 (2006.01)
B01F 15/00 (2006.01)
G01S 5/14 (2006.01)
G01P 15/00 (2006.01)
G01S 11/14 (2006.01)
B28C 5/42 (2006.01)

(52) U.S. Cl.
CPC .......... G01S 1/72 (2013.01); B01F 15/00266 (2013.01); B28C 5/422 (2013.01); G01P 15/00 (2013.01); G01S 5/14 (2013.01); G01S 11/14 (2013.01)

(58) Field of Classification Search
USPC ........................................................ 367/129
See application file for complete search history.

(56) References Cited

U.S. PATENT DOCUMENTS 6,227,039 B1   5/2001  Te'eni
7,135,976 B2 * 11/2006  Neff .................. G01S 13/08
                                          340/539.13

(Continued)

FOREIGN PATENT DOCUMENTS

WO   2011/157941 A1   12/2011

OTHER PUBLICATIONS

A. Filipik, J. Jan, I. Peterlik. "Time-of-Flight Based Calibration of an Ultrasonic Computed Tomography System". Radioengineering, vol. 21, No. 1, Apr. 2012.*

(Continued)

Primary Examiner — James R Hulka
(74) Attorney, Agent, or Firm — Westerman, Hattori, Daniels & Adrian, LLP (57) ABSTRACT

The method for instrumenting a container, especially intended to receive an assortment of materials, capable of being set moving in a preset coordinate system, said method comprises the following steps: placing at least one communicating element in the container on an internal surface of the container; and tracking the location of each communicating element over time in the preset coordinate system.

23 Claims, 4 Drawing Sheets

(56) References Cited

U.S. PATENT DOCUMENTS

| | | | |
|---|---|---|---|
| 8,989,905 B2* | 3/2015 | Sostaric | B01F 15/00207 361/1 |
| 9,187,993 B2* | 11/2015 | Schmidt | E21B 47/122 |
| 2004/0233054 A1* | 11/2004 | Neff | G01S 13/08 340/539.1 |
| 2005/0100465 A1* | 5/2005 | West | G01V 1/52 417/448 |
| 2009/0037026 A1 | 2/2009 | Sostaric et al. | |
| 2009/0133593 A1* | 5/2009 | Till | B41J 3/4073 101/35 |
| 2011/0004344 A1 | 1/2011 | Pinton et al. | |
| 2011/0222995 A1* | 9/2011 | Irie | B25J 9/1687 414/225.01 |
| 2012/0273191 A1* | 11/2012 | Schmidt | E21B 47/122 166/250.1 |
| 2012/0273192 A1* | 11/2012 | Schmidt | E21B 47/122 166/250.1 |
| 2012/0296469 A1* | 11/2012 | Yoshinaga | B25J 15/0616 700/218 |
| 2013/0271343 A1 | 10/2013 | Thomas | |
| 2015/0267531 A1* | 9/2015 | Schmidt | E21B 47/122 73/152.58 |
| 2015/0290805 A1* | 10/2015 | Morency | B25J 9/1679 700/99 |

OTHER PUBLICATIONS

French Search Report dated Mar. 14, 2013, issued in corresponding application No. FR1356180; with partial English translation.

Zhang et al., "Navigation with IMU/GPS/Digital Compass with Unscented Kalman Filter", Proceedings of the IEEE, 2005, pp. 1497-1502.

* cited by examiner

METHOD FOR INSTRUMENTING A CONTAINER INTENDED TO BE SET MOVING IN PARTICULAR IN ORDER TO MIX AN ASSORTMENT OF MATERIALS

TECHNICAL FIELD OF THE INVENTION

The invention relates to the field of the processing of materials, especially involving the tracking of the location of a beacon, or communicating element, placed in an instrumented container.

More particularly, the subject of the invention is a method for instrumenting a container, especially one intended to receive an assortment of materials for example forming a concrete or mortar mixture.

PRIOR ART

In the field of materials, and especially concrete, it may be paramount to control the consistency of the material or materials placed in a container, advantageously a moving container.

In the particular example of concrete, the latter comprises an aggregate generally formed by an assortment of sand, gravel and rocks. The concrete is manufactured in a specialized factory where it is tested before it is sent in a mixer truck to a construction site where it is poured out. It is important for the concrete to remain a similar consistency to when it left the factory despite its transportation. For this purpose, it is known to inspect the consistency of the concrete by eye and, if required, add water.

Therefore, it follows that there is a need to facilitate and automate such inspection.

SUBJECT OF THE INVENTION

The aim of the present invention is to provide a solution allowing a container to be instrumented with a view to localizing an element inside the container or to monitoring the contents thereof.

This aim is at least partially obtained by virtue of a method for instrumenting a container, forming a recipient for an assortment of materials, configured to mix the assortment of materials capable of being set moving in a preset coordinate system, said method comprising the following steps:
 placing at least one communicating element in the container on an internal surface of the container; and
 tracking the location of each communicating element over time in the preset coordinate system.

Preferably, the placing step comprises placing a plurality of communicating elements on the internal surface of the container and determining the positions of the various communicating elements relative to the internal surface of the container.

According to one embodiment, the internal surface of the container bounds an internal volume of known geometry, and the step of placing the communicating elements comprises the following steps:
 randomly introducing the communicating elements into the container, preferably while it is moving;
 fastening the communicating elements to the internal surface of the container, preferably via magnetic attraction between each communicating element and the internal surface of the container; and
 determining, by way of data delivered by the communicating elements and of the known geometry, the position of the various communicating elements relative to the internal surface of the container.

Preferably, the data delivered by the communicating elements correspond to behaviour data determined for the communicating elements and/or to data determined for the distance separating the communicating elements once the latter have been fastened to the internal surface of the container.

Moreover, the method may also comprise a step of determining behaviour data of the communicating elements by way of at least one of the following sensors equipping each of the communicating elements: an accelerometer, a magnetometer, and/or a gyroscope.

Advantageously, the method comprises a step of determining distance data by way of distance sensors equipping the communicating elements, each communicating element preferably comprises an acoustic sensor and/or an optical sensor forming a distance sensor.

According to one particular embodiment, the step of determining the positions of the communicating elements is implemented by way of a step of applying a calculation function taking as input: the data determined for the distance between the communicating elements and/or the behaviour data determined for the communicating elements and/or a preset list of possible positions of the communicating elements relative to the internal surface of the container and/or a preset list of possible behaviours of the communicating elements.

For example, the calculation function is a greedy algorithm determining optimal positions for each of the communicating elements from all of said possible positions and all of said possible behaviours depending on the behaviour data determined for the communicating elements and on the data determined for the distance between the communicating elements.

Moreover, the calculation function may take into account a measurement noise associated with the determined distance data and a measurement noise associated with the determined behaviour data, the calculation function preferably considers the measurement noises as being additive and Gaussian.

The invention also relates to a method for monitoring at least one electronic object, this method comprising the following steps:
 implementing the instrumenting method such as described;
 introducing the electronic object into the container; and
 studying the behaviour of the electronic object in the container, preferably while the container is moving in the preset coordinate system, on the basis of an interaction of the electronic object with each communicating element.

Advantageously, especially when the placing step comprises placing a plurality of communicating elements on the internal surface of the container and determining the positions of the various communicating elements relative to the internal surface of the container, the step of studying the behaviour of the electronic object comprises the following steps:
 determining the location of the electronic object relative to the communicating elements; and
 determining the location of the electronic object in the preset coordinate system, by way of the location determined for the electronic object relative to the communicating elements and by way of the positions of the communicating elements in the preset coordinate system at a corresponding instant in the step of tracking the location of the communicating elements over time in the preset coordinate system.

Preferably, the monitoring method comprises a step of tracking the location of the electronic object in the preset coordinate system over time.

According to one particular embodiment, the monitoring method comprises a step of at least partially filling the container with an assortment of materials, preferably aggregate.

The electronic object may take the form of one material of the assortment of materials and is placed in the assortment of materials before, after, or during the filling step.

The monitoring method may furthermore comprise a step of characterizing the state of the assortment of materials in the container on the basis of the step of studying the behaviour of the electronic object.

The invention also relates to a device for implementing at least the instrumenting method, this device comprising: at least one communicating element, an element for determining the location of the communicating element, preferably relative to the internal surface of the container, and an element for determining the tracking of the location of each communicating element in the preset coordinate system when the container is moving in said preset coordinate system.

According to one particular embodiment, the device may comprise:
  at least one electronic object capable of interacting with a plurality of communicating elements of the device;
  an element for determining the location of the electronic object relative to the communicating elements on the basis of the interaction between the communicating elements and the electronic object; and
  an element for determining the location of the electronic object in the preset coordinate system by way of data delivered by the element for determining the location of the electronic object relative to the communicating elements.

The invention also relates to a communicating element intended to be used in the context of the device such as described, this communicating element comprises a sealed housing containing electronics, a first face of the sealed housing being formed by a magnet, a second face of the sealed housing, other than the first face, comprising an emitter and a receiver that are connected to the electronics and configured so as to participate in determining the distance between said communicating element and another identical communicating element.

BRIEF DESCRIPTION OF THE DRAWINGS

Other advantages and features will become more clearly apparent from the following description of particular embodiments of the invention, which embodiments are given by way of nonlimiting example and illustrated in the appended drawings in which.

DESCRIPTION OF PREFERRED
EMBODIMENTS OF THE INVENTION

With regard to inspecting a moving container, especially a concrete mixer truck, the method described below differs from the prior art in that it allows the container to be instrumented, especially with the aim of using data delivered by the instrumentation with a view to ensuring a good consistency of the contents of the container, such as a concrete or mortar mixture.

Figure 1:
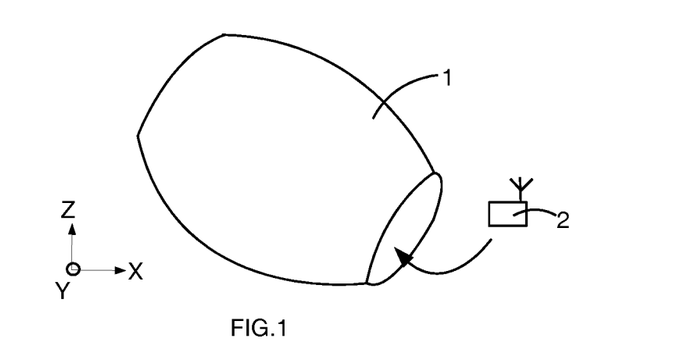
FIG. 1 is a perspective view of a container into which a communicating element will be placed.
Figure 2:
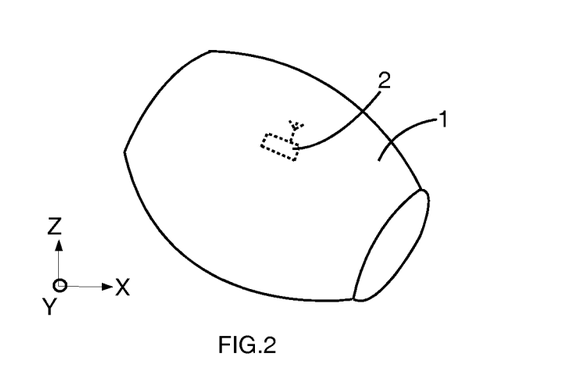
FIG. 2 is a perspective view of the container in FIG. 1, to which the communicating element has been fastened.
Figure 3:
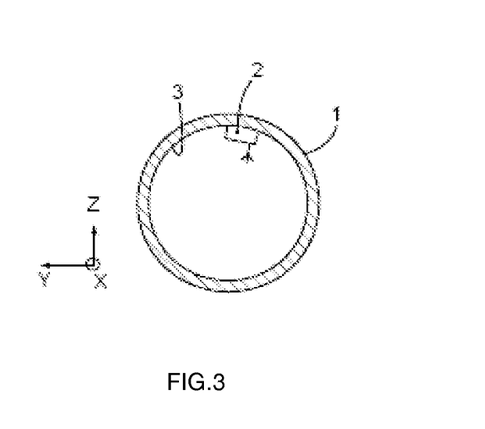
FIG. 3 illustrates a cross-sectional view of the container in FIG. 2.

In FIGS. 1 to 3, a method for instrumenting a container 1 capable of being set moving in a preset coordinate system (X,Y,Z) comprises a step of placing (FIG. 1) at least one communicating element 2 in the container 1, especially on an internal surface 3 of the container 1. Moreover, such an instrumenting method comprises a step of tracking the location of each communicating element 2 over time in the preset coordinate system (X,Y,Z). It will be understood that on the basis of the location-tracking step, it is possible to extrapolate data with a view to using said data, for example, to analyse a behaviour of the container and/or of the contents of the container.

The expression "preset coordinate system" is preferably understood to mean an orthonormal coordinate system in three dimensions X, Y, Z.

Preferably, the container is intended to receive an assortment of materials such as a concrete mixture or even a mortar mixture. In other words, the container 1 may advantageously form a recipient for an assortment of materials, this recipient being configured to mix the assortment of materials preferably in order to prevent it from setting. It will be understood that the assortment of materials may have a first state in which it may be mixed/intermixed (the assortment of materials is then said to be "wet") and a second so-called set state in which the materials of the assortment of materials are aggregated so as to form a solid block, for example due to the assortment of materials having dried out (the assortment of materials is then said to be "dry").

The container may be configured to mix materials in order to control the quality of these materials.

Each communicating element may also be used to extrapolate the qualitative state of the assortment of materials in the container. In this case, each communicating object may comprise appropriate sensors (attitude sensor, moisture sensor, temperature sensor, etc.). Thus, tracking the location of a communicating element 2 in the container 1, especially when the latter is at least partially filled with the (wet) assortment of materials, may play a role in determining the qualifying state or in determining the behaviour of the assortment of materials in the container 1.

The expression "communicating element" is understood to mean an element, especially an electronic element, configured to communicate information and/or carry out measurements, for example in order to communicate said measurements to a calculating module. A communicating element 2, especially when it is alone in the container 1, may, for example, comprise a camera allowing the volume to be mapped with a view to determining its position and/or analysing the contents of the container (i.e. the assortment of materials in the example).

The expression "placing a communicating element 2 on an internal surface 3 of the container 1" is understood to mean that the communicating element 2 is fastened to the internal surface 3. For example, this fastening is achieved by adhesive bonding, magnetic attraction, screw fastening, etc. Once fastened to the internal surface 3, the communicating object 2 may, for example, carry out measurements or analyses representative of the contents of the container 1.

Advantageously, the placing step comprises placing a plurality of communicating elements 2 on the internal surface 3 of the container 1 and determining the positions of the various communicating elements 2 relative to the internal surface 3 of the container 1. Using a plurality of communicating elements 2 especially allows the amount of data delivered by these communicating elements to be increased, for example in order to improve the characterization of the contents of the container.

According to one particular embodiment, the container 1 comprises preset locations for fastening the communicating elements. If these locations are known and fixed, it will then be possible to determine the position of the communicating elements 2 over time directly, for example by way of attitude sensors placed in each of the communicating elements 2.

Attitude sensors, also called position sensors in the present description, are capable of determining the orientation of a communicating element 2 equipped therewith in the preset coordinate system.

Thus, it will be understood that each communicating element 2 may be equipped with an accelerometer and/or a magnetometer and/or a gyroscope each forming a location sensor. The presence of an accelerometer and a magnetometer in a communicating element 2 allows its static behaviour to be determined, and the addition of a gyroscope its dynamic behaviour.

The tracking of the positions of the communicating elements may be obtained by way of the location/attitude sensors and the distances separating the various communicating elements. The teachings of the document "Navigation with IMU/GPS/Digital Compass with Unscented Kalman Filter" by Pifu Zhang and al. may for example be used for this purpose (published July 2005, Proceedings of the IEEE, International Conference on Mechatronics & Automation, Niagara Falls, Canada).

However, it is not always possible to position the communicating elements 2 in precise, known locations in the container 1. In addition, it is more ergonomic and user-friendly for a user to be able to place these communicating elements 2 randomly. However, if the various communicating elements are placed randomly, it is necessary to determine their position relative to one another.

Figure 4:
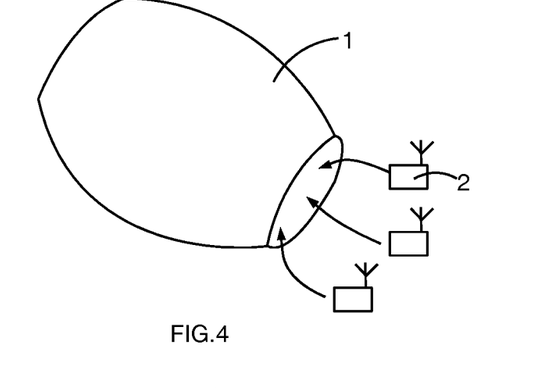
FIG. 4 illustrates a particular step of the instrumenting method, in which step a plurality of communicating elements are added to the container.

Thus, according to one embodiment illustrated in FIG. 4, when the internal surface 3 of the container 1 bounds an internal volume of known geometry, the step of placing the communicating elements 2 advantageously comprises randomly introducing the communicating elements 2 into the container 1, preferably while it is moving. If the container 1 is moving, it will be easier to ensure that the communicating elements 2 adopt different positions on the internal surface 3 (FIG. 5).

In the context of the present embodiment of the method, the step of placing the communicating elements 2 furthermore comprises a step of fastening the communicating elements 2 to the internal surface 3 of the container 1, preferably via magnetic attraction between each communicating element 2 and the internal surface 3 of the container 1. Thus, it will be understood that the internal surface 3 of the container 1 may be formed by a ferromagnetic material and that each communicating element 2 may comprise a magnet, whether permanent or not. Moreover, the step of placing the communicating elements 2 furthermore comprises determining, by way of data delivered by the communicating elements and of the known geometry, the position of the various communicating elements 2 relative to the internal surface 3 of the container 1.

Figure 5:
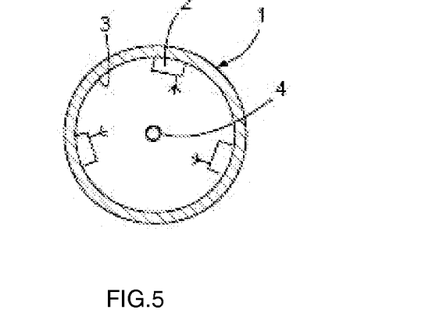
FIG. 5 illustrates a cross-sectional view of the container after the plurality of communicating elements have been added and fastened.

Preferably, the communicating elements 2 are each configured so as to be able to interact, for example communicate, with an electronic object 4 intended to move about in the container 1 (FIG. 5). According to one embodiment, this interaction corresponds to determining the position of the electronic object 4 relative to the communicating elements 2. This embodiment will be described in greater detail below.

Preferably, the data delivered by the communicating elements 2 correspond to behaviour data determined for the communicating elements 2 and/or to data determined for the distance separating the communicating elements 2 once the latter have been fastened to the internal surface 3 of the container 1.

In other words, the instrumenting method may comprise a step of determining behaviour data of the communicating elements 2 by way of at least one of the following behaviour sensors equipping each of the communicating elements: an accelerometer, a magnetometer, and/or a gyroscope.

It will also be understood that the method may comprise a step of determining distance data by way of distance sensors equipping the communicating elements 2, and each communicating element 2 may preferably comprise an acoustic sensor and/or an optical sensor forming a distance sensor. For example, if each communicating element 2 transmits a sound at a given instant it is possible to determine, from the propagation speed of the sound and the instant said sound is received by the other communicating elements 2, for example using the calculating module connected to all the communicating elements and receiving (synchronized) information delivered by the communicating elements 2, the distance separating the communicating element 2 that emitted the sound from each of the communicating elements 2 that received the emitted sound. Thus, each distance sensor may comprise an acoustic or optical emitter and receiver. The various communicating elements 2 may be distinguished from each other by the type of sound that they emit, for example different spectra may be used or different pulse lengths or a signature may precede the pulse, etc. The optical sensor may function in a similar way, only the light intensity/distance relationship being more complex.

According to one particular embodiment combining all or some of the behaviour sensors and distance sensors, the positions of the communicating elements 2 may be determined by way of calculations performed on measurement data delivered by the various sensors in question, and of the known geometry of the volume of the container 1. In other words, in a preset reference coordinate system the origin of which is attached to the volume of the container 1, the position of the communicating elements 2 fastened to the container is determined based on knowledge of the geometry of the volume of the container, of the measured behaviour of the communicating elements 2 and of the distance between the communicating elements 2. The minimum number of measurements depends on the geometry of the container 1, but preferably, at least four preferably non-coplanar communicating elements 2 will be placed therein.

Thus, the placing step advantageously comprises placing at least four communicating elements 2 into the container 1. In order to make the calculations easier, these communicating elements are fastened to the internal surface 3 so as not to be coplanar. If the case arises where they are coplanar, an additional communicating element that is not coplanar with the others will advantageously be placed inside the container so as to differentiate the communicating elements located in the container.

In one particular example in which the container is a sphere of given radius, the position of a point on said sphere is parameterizable by two angles: inclination and azimuth. These angles are given by the attitude/behaviour sensors. In this context, each communicating element easily determines its position at each instant.

In another particular example, the container may have a square cross-section and for example be bounded by a cube. For a cube of given side length, there are six possible attitudes/behaviours associated with each face. The attitude of the communicating element does not determine its position but only the face to which it is fastened. At least four non-coplanar communicating elements are then required to obtain a 4×4 distance matrix that will be used to obtain a 4×3 position matrix. All the position matrices that can be obtained with a distance matrix are connected by a three-dimensional isometry. Knowledge of the geometry of the volume and the attitudes/behaviours removes any ambiguity.

For simplicity, in the context of a square (if the third dimension of a cube is removed) only three non-aligned communicating elements are necessary. One attitude determines the attitude of the square because it is known that the sensors are inside the container. The position of each communicating element is parameterized by a single parameter constrained by the dimensions of the square. This parameter is determined via the distances between the communicating elements.

Figure 6:
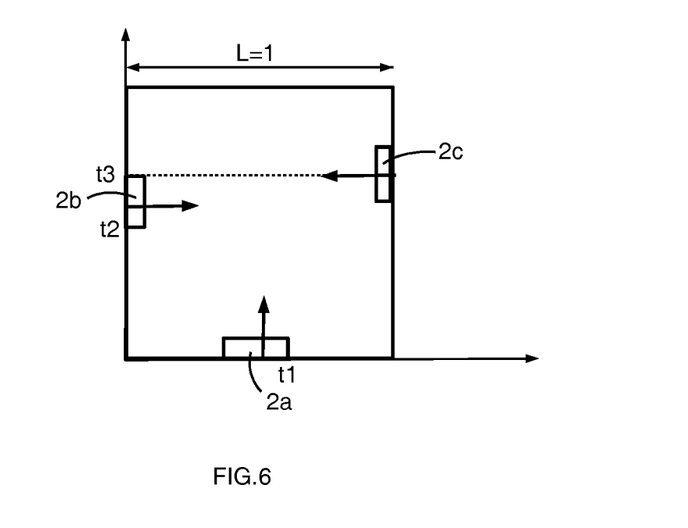
FIG. 6 is a view illustrating the principle used to determine the positions of the communicating elements relative to one another in the preset coordinate system.

In an example illustrated in FIG. 6 and representing a simple case where a length L, equal to 1, represents the length of one side of the square, the measured attitudes give the attitude of the square (here, a square is considered the system of axes of which corresponds to the system of axes of the preset coordinate system, i.e. rotation is identity) and the side lengths associated with each communicating element $2a$, $2b$, $2c$. Thus, the following location parameters P are obtained for the communicating elements $2a$, $2b$, $2c$: $P_2a$ (t1, 0); $P_2b$ (0, t2); $P_c$ (1, t3), where $0 \leq ti \leq 1$ for i=1, 2 and 3, t1 being the X coordinate in FIG. 6 of the communicating element $2a$, t2 the Y coordinate in FIG. 6 of the communicating element $2b$, and t3 the Y coordinate in FIG. 6 of the communicating element $2c$. The measured distances are related to the parameters by the 3 following equations:

$$t1^2 + t2^2 = d^2_{2a,2b}$$

$$(t1-1)^2 + t3^2 = d^2_{2a,2c}$$

$$1 + (t3-t2)^2 = d^2_{2b,2c}$$

The first equation gives $t2 = \sqrt{d_{2a,2b}^2 - t1^2}$ because $t2 \geq 0$. The second equation gives $t3 = \sqrt{d_{2a,2c}^2 - (t1-1)^2}$ because $t3 \geq 0$.

The last equation is an equation in t1 having a single solution comprised in the segment [0; 1]. Thus, the coordinates of each communicating element are found.

The two examples above show that it is indeed the known geometry of the volume that determines the method used to reconstruct the positions of the communicating elements 2 fastened to the internal surface 3 of the container 1. However, sufficient data with respect to distances, attitudes and geometries allow this problem to be inversed whatever the geometry. The more complex the geometry (non-convexity, asymmetry etc.), the larger the amount of data required.

Figure 7:
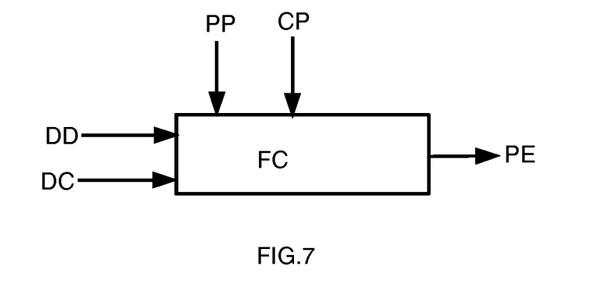
FIG. 7 schematically illustrates the algorithm allowing the positions of the various communicating elements in the preset coordinate system to be determined.

It will be understood from the above that according to one particular embodiment illustrated in FIG. 7, the step of determining the positions PE of the communicating elements 2 is implemented by way of a step of applying a calculation function FC taking as input: the data DD determined for the distance between the communicating elements 2 and/or the behaviour data DC determined for the communicating elements 2 and/or a preset list of possible positions PP of the communicating elements 2 relative to the internal surface 3 of the container 1 and/or a preset list of possible behaviours CP of the communicating elements. The possible positions PP and the possible behaviours/attitudes CP may be likened to vectors the calculation of which will not be described in detail here because it is within the competence of those skilled in the art. The possible behaviours are representative of values that the behaviour sensors may take in each possible position of a communicating element.

In fact, when the internal surface 3 of the container 1 bounds an internal volume of known geometry, it is a priori possible to decrease the number of positions envisageable for the communicating elements 2 on the surface of the container depending on the shape of the elements on their faces provided to make contact with the container, for example in the case of a container having a complex shape. Thus, it is possible to know an array of possible positions for the communicating elements 2 on the internal surface 3 of the container 1 and an array of possible behaviours for said communicating elements 2. The calculation function FC may be a "greedy" algorithm determining optimal positions for each of the communicating elements 2 from all of said possible positions PP and all of said possible behaviours CP depending on the behaviour data DC determined for the communicating elements 2 and on the data DD determined for the distance between the communicating elements 2. In other words, the "greedy" method consists in testing all the possible solutions and in seeing which best solve the problem.

Although a "greedy" algorithm has been given by way of example, other types of algorithms may also be used such as the gradient descent method or any other type of suitable optimization method, depending on the shape of the container.

Neglecting the measurement noise generated by the various sensors in question, the greedy algorithm will find the vector PE among all the possible positions PP and behaviours CP that corresponds perfectly to DD and DC. The function that allows PP to be transformed to DD is then denoted f, i.e. DD=f(PE), f being a function that gives the distances as a function of position (it does not depend on the volume of the container). The function that allows PE to be transformed to DC is denoted g, i.e. DC=g(PE), g being a function that gives behaviour as a function of position (it clearly depends on the volume of the container).

According to one particular embodiment, the calculation function FC takes into account a measurement noise associated with the determined distance data DD and a measurement noise associated with the determined behaviour data DC, the calculation function especially considers the measurement noises as being additive and Gaussian. Specifically, the noisy case will generally be that which obtains the greatest precision insofar as it corresponds to the actual real-world case.

In other words, in the noisy case, if the measurement noises are all assumed to be additive and Gaussian (which in practice is a valid assumption) the following measurement models may then be used:

$$DD = f(PE) + B\_D,$$

$$DC = g(PE) + B\_C,$$

where B_D and B_C are the measurement noises in the distances and behaviours of respective covariance matrices V_D and V_C.

The optimal estimator of PE, denoted PEO is then the solution to the following optimization problem:

$$PBO = \mathrm{argmin}(DD - f(PE))'V\_D(DD - f(PE)) + (DC - g(PE))'V\_C(DC - g(PE))PE$$

This problem may be solved using a greedy method or a gradient descent method. It should be noted that g may be a discrete function (or not depending on the volume) and that PE is constrained to fit into the volume of the container of known geometry.

Such instrumentation may be advantageous for various uses of the container. For example, an electronic object 4 placed in the container, as mentioned above, may then be monitored by way of each of the communicating elements 2 (FIG. 5). This monitoring may then involve determining the distance between each communicating element 2 and said electronic object 4 in order to study the behaviour of said electronic object while the container 1 is moving in the aforementioned preset coordinate system.

Thus, the invention also relates to a method for monitoring at least one electronic object 4, which comprises a preliminary step of implementing the instrumenting method such as described above so as to instrument said container 1. Moreover, the monitoring method also comprises a step of introducing the electronic object 4 into the container 1, and a step of studying the behaviour of the electronic object 4 in the container 1, preferably while the container 1 is moving in the preset coordinate system, on the basis of an interaction of the electronic object 4 with a communicating element 2 or, if necessary, with the communicating elements 2 (and preferably with each communicating element). The interaction referred to here may be a distance measurement (for example of the same type as that used to measure the distance between the communicating elements, as described above), video surveillance by way of a video camera embedded by the communicating element, etc. It will be understood here that the communicating elements are fastened to the internal surface of the container whereas the electronic object is free to move in the container.

According to one particular embodiment, the step of studying the behaviour of the electronic object 4 may comprise the following steps: determining the location of the electronic object 4 relative to the communicating elements 2, and determining the location of the electronic object in the preset coordinate system by way of the location determined for the electronic object 4 relative to the communicating elements and by way of the positions of the communicating elements 2 in the preset coordinate system at a corresponding instant in the step of tracking the location of the communicating elements 2 over time in the preset coordinate system. In other words, the position of the electronic object 4 is first determined in a frame of reference defined by the communicating elements 2, i.e. it is sought to determine the position of the electronic object 4 in the container relative to the communicating elements 2, before this position in the frame of reference of the communicating elements is transformed to the frame of reference of the preset coordinate system (i.e. that in which the container 2 is moving).

Thus, by determining the position of the electronic object 4 a plurality of times over time, it is possible to determine the behaviour of the electronic object 4 in the container 1 as a function of its movement. In other words, the monitoring method may comprise a step of tracking the location of the electronic object 4 in the preset coordinate system over time.

Studying the behaviour of the electronic object 4 in the container 1, in particular in the preset coordinate system when the container 1 is moving, may for example allow a medium contained in the container, such as the aforementioned concrete or mortar mixture, to be analysed.

Thus, the monitoring method may comprise a step of at least partially filling the container 1 with an assortment of materials, preferably aggregate for example forming concrete. This filling step may be carried out at the same time as the instrumenting method or afterwards. Moreover, when this filling step is carried out at the same time as the instrumenting method, the communicating elements 2 may be added to the container 1 either after or during the filling step.

Advantageously, the electronic object 4 takes the form of one material of the assortment of materials and is placed in the assortment of materials before, after, or during the filling step.

The expression "takes the form of one material of the assortment of materials" is understood to mean that the electronic object 4 has an external shape, a weight and/or dimensions substantially identical to those of said material. As a consequence, the electronic object 4 behaves, in the container 1, identically to the materials of the assortment of materials. As a result, it is simpler to deduce therefrom the behaviour of the assortment of materials.

Thus, it will be understood that the method for monitoring the electronic object may comprise a step of characterizing the state of the assortment of materials in the container on the basis of the step of studying the behaviour of the electronic object 4. This characterization will be all the more relevant because the behaviour of said electronic object 4 is identical to that of the materials that make up the assortment of materials.

The state of the assortment of materials may be characterized in real time when the communicating elements and/or the electronic object are connected via a communicating module to the calculating module. If the communicating module is not present, each communicating element may store at each discrete instant (the sampling period of which is preset and is the same for all the communicating elements) its behaviour/attitude and its distance from the other communicating elements. Certain distances may be lacking at certain instants (visibility problems, measurement failure, etc.). It will be noted that this sporadic missing information is rarely a problem because it does not greatly decrease the level of observability (specifically, not all the distances are required to estimate position). On exiting the container, the data from all the communicating elements and/or electronic objects are transferred to the calculating module, which applies the principles described above.

Figure 8:
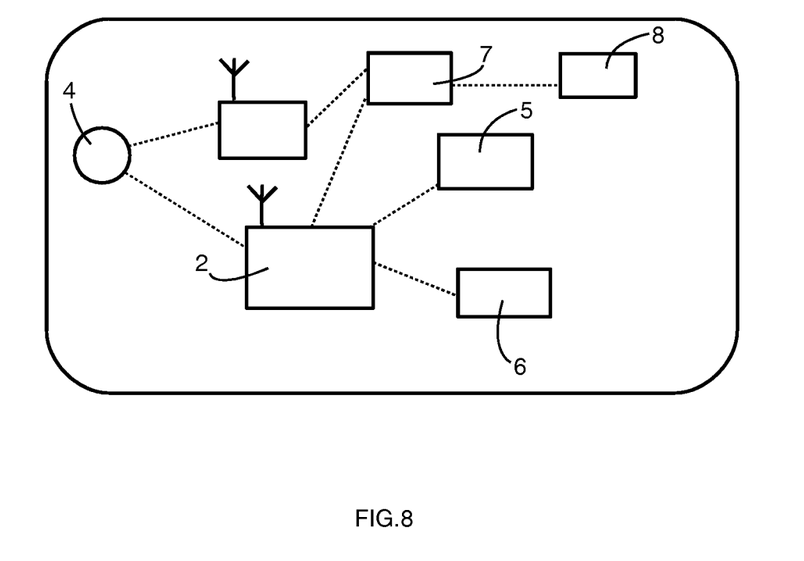
FIG. 8 illustrates a device configured to be used in the context of the implementation of the instrumenting method.

As illustrated in FIG. 8, a device allowing at least the instrumenting method to be implemented comprises: at least one communicating element 2, an element 5 for determining the location of the communicating element, preferably relative to the internal surface of the container, and an element 6 for determining the tracking of the location of each communicating element in the preset coordinate system when the container is moving in said preset coordinate system. Moreover, the device may also comprise at least one electronic object 4 capable of interacting with a plurality of communicating elements 2 of the device, an element 7 for determining the location of the electronic object relative to the communicating elements on the basis of the interaction between the communicating elements 2 and the electronic object 4, and an element 8 for determining the location of the electronic object 4 in the preset coordinate system by way of data delivered by the element 7 for determining the location of the electronic object relative to the communicating elements 2. Thus, it will be understood that such a device is, in this case, also configured to implement the monitoring method such as described above.

In fact, generally, the device may comprise as many particular elements as the instrumenting or monitoring methods comprise steps. This being the case, each particular element of the device is then configured to accomplish the function of the step in question.

Figure 9:
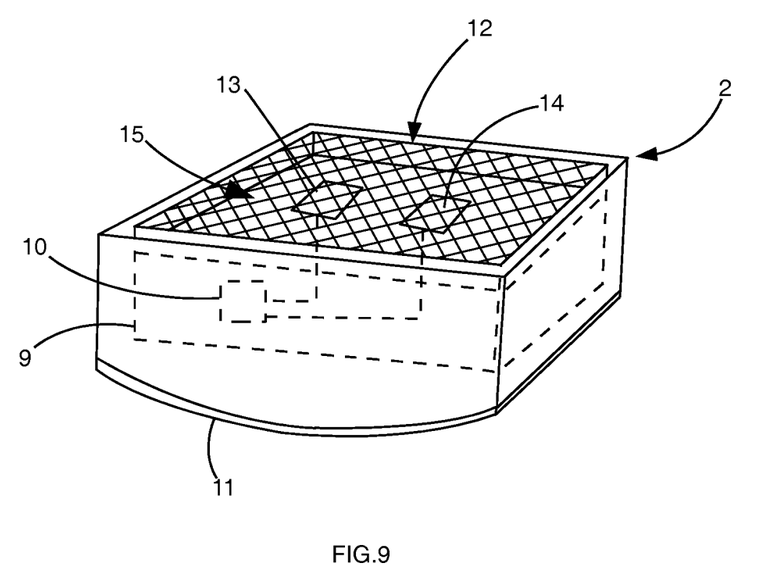
FIG. 9 illustrates one particular embodiment of a communicating element.

According to one particular embodiment illustrated in FIG. 9, a communicating element 2 comprises a lower face 11 intended to interact with the internal surface of the container, this face is advantageously magnetized and/or shaped so as to match a portion of the internal surface of the container. Opposite this magnetized face, lies a sealed zone 9 in which the distance and/or attitude sensors may be completely or partially placed. On an upper face 12 opposite the lower face 11, an acoustic (or optical) emitter 13 and an acoustic (or optical) receiver 14 are placed so as to allow the external environment of the communicating element 2 to be measured. The emitter and receiver 13, 14 may be connected to electronics 10 contained in the sealed zone 9. Moreover, the upper face 12 may be protected by a protective grille 15. This protective grille 15 protects the emitter and receiver 13, 14 while allowing them to emit or receive signals to, or from, the other side of the protective grille 15. The emitter and receiver 13, 14 may be formed by a vibrating membrane made of PZT (lead zirconate titanate). The emitter and receiver 13, 14 are advantageously connected via electrodes (drawn with dotted lines in FIG. 9) to the electronics 10 (especially a battery and a controller) located in the sealed portion and without adversely affecting the seal. In particular, the electronics 10 in the sealed zone 9 may comprise a communicating module, an inertial unit (accelerometer, magnetometer and gyroscope, all preferably in 3 axes), a battery, a memory and an on-board processor. The on-board processor for example allows the control of the emitter and the data provided by the sensors to be managed, or even the distances separating the communicating element in question from all the other communicating elements to be determined.

In other words, generally, the communicating element 2 in FIG. 9, which element 2 is intended to be used in the context of the device such as described or at least in one of the instrumenting or monitoring methods such as described, comprises a sealed housing 9 containing electronics 10, a first face 11 of the sealed housing 9 being formed by a magnet (permanent or otherwise), preferably intended to interact with the internal surface of the container, a second face 12 of the sealed housing, other than the first face, comprising an emitter 13 and a receiver 14 that are connected to the electronics 10 and configured so as to participate in determining the distance between said communicating element and another identical communicating element and advantageously to determine the position of the electronic object in the container.

Depending on the application, the communicating module may be optional if there is no need to process the information recorded by all the communicating elements in real time. If not, the communicating module of each communicating element may communicate with a calculating module, which will especially be placed outside of the volume of the container (for example on the truck transporting the assortment of materials in the context of a mixer truck). In this case, all the communicating elements are advantageously equipped with an antenna suitable for the application. It is also possible to envision communication via the internal surface of the container, for example using a carrier current if the internal surface of the container is electrically conductive. In the context of wireless communication in a moist medium such as concrete for example, a suitable antenna of the type described in document WO 2011/157941 may be used.

Furthermore, the communicating element or elements and/or the electronic object may be configured so as to measure other information such as pH, temperature, humidity, drying time, etc.).

Preferably, the internal surface of the container is concave in shape so as to allow the various possible positions and possible distances of the communicating elements to be differentiated. This is especially the case when the container is a mixer on a truck for delivering concrete or mortar.

The electronic object may be remotely powered so as to interact with each communicating element (for example by exchange of sounds for the calculation of distances).

The electronic object may have an identical structure to that of the communicating elements, except as regards the means enabling said elements to be fastened to the walls of the container (for measurement of distance/attitude). An electronic object may be provided with a system that receives a pulse originating from the communicating elements and emits an (optical and/or acoustic) pulse in reply. A passive electronic object, passive in the sense that it does not emit any signals intended for the communicating elements, may also be provided. For example, if the communicating elements are provided with a thermal camera, the electronic object may simply be fitted with a heating element in order to be detected.

The methods described above are particularly applicable to the field of cement, especially when the latter must be transported in a mixing truck, also called an in-transit mixer or a mixing transport truck (the mixer or drum then forms the container).

Moreover, it will be understood from the above that, if the need arises, the movement of the container may correspond to a step of mixing of the contents thereof. The movement of the container then advantageously comprises at least one component of rotation of the container about itself.

According to one particular embodiment, the communicating elements and/or the electronic object or objects may comprise remote power-supply means and be poured out with the concrete when it is unloaded from the container, in order to deliver appropriate information once buried and especially once the concrete has dried.

The invention claimed is:

1. A method for communicating with a container, forming a recipient for an assortment of materials configured to mix the assortment of materials, capable of being set in motion in a preset coordinate system, wherein the method comprises:
  randomly placing a plurality of communicating elements in the container on an internal surface of the container, the communicating elements being fastened to the internal surface of the container and configured to deliver information outside of the container, the container having a known geometry;
  determining a position of each of the communicating elements relative to one another on the internal surface of the container, wherein each of the communicating elements is equipped with a distance sensor, wherein the distance sensors acquire data representing distances between the respective communicating element and the other communicating elements, and wherein the position of each of the communicating elements on the internal surface of the container is determined from the known geometry of the container and from data delivered by the communicating elements taking into account the data representing the distances between the communicating elements acquired by the sensors; and
  tracking the location of each of the communicating elements over time in the preset coordinate system while the container is in motion in the preset coordinate system, so as to define a frame of reference of the communicating elements relative to a frame of reference of the preset coordinate system in which the container is in motion.

2. The method according to claim 1, wherein each of the communicating elements is equipped with at least one sensor selected from the group consisting of an accelerometer, a magnetometer, and a gyroscope, wherein the method comprises determining the data representing a behaviour of the communicating elements from the at least one sensor.

3. The method according to claim 1, wherein the determining of the positions of the communicating elements comprises applying a calculation function taking as input at least one of:
  a preset list of possible positions of the communicating elements relative to the internal surface of the container, and
  a preset list of possible behaviours of the communicating elements.

4. The method according to claim 3, wherein the calculation function is a greedy algorithm determining optimal positions for each of the communicating elements from at least one of (i) all possible respective positions and (ii) all possible behaviours, depending on at least one of (iii) the data representing the evolution of the respective positions of the communicating elements and (iv) the data representing the respective distances between the communicating elements.

5. The method according to claim 3, wherein the calculation function receives as input a measurement noise associated with at least one of (i) the data representing the behaviours of the communicating elements and (ii) the determined data representing the respective distances between the communicating elements.

6. The method according to claim 5, wherein the calculation function considers the measurement noises as being additive and Gaussian.

7. A method for monitoring at least one electronic object, wherein the method comprises:
  implementing the method according to claim 1;
  introducing the at least one electronic object into the container; and
  tracking a behaviour of the at least one electronic object in the container from data delivered by at least one of the communicating elements regarding an interaction of the electronic object with the communicating element in which the communicating element acquires data on the location of the electronic object relative to the communicating element.

8. The method according to claim 7, wherein the tracking of the behaviour of the at least one electronic object is performed while the container is moving in the preset coordinate system.

9. The method according to claim 7,
  wherein the tracking of the behaviour of the at least one electronic object comprises:
    determining the location of the at least one electronic object relative to the communicating elements; and
    determining the location of the electronic object in the preset coordinate system, from the location determined for the electronic object relative to the communicating elements and from the positions of the communicating elements in the preset coordinate system at a corresponding instant in the tracking of the location of the communicating elements over time in the preset coordinate system.

10. The method according to claim 7, wherein the method comprises tracking the location of the at least one electronic object in the preset coordinate system over time.

11. The method according to claim 7, wherein the method comprises at least partially filling the container with an assortment of materials.

12. The method according to claim 11, wherein the electronic object takes the form of one material among the assortment of materials and is placed in the assortment of materials before, after, or during the filling.

13. The method according to claim 11, wherein the method comprises obtaining information on the state of the assortment of materials in the container from the tracking of the evolution of the movement of the electronic object.

14. The method according to claim 11, wherein the container is a cement mixer transported on a truck, and the method comprises at least partially filling the container with aggregate.

15. The method according to claim 1, wherein the random introduction of each of the communicating elements into the container is performed while the container is moving.

16. The method according to claim 1, wherein the fastening of each of the communicating elements to the internal surface of the container is performed via magnetic attraction between each of the communicating elements and the internal surface of the container.

17. The method according to claim 1, wherein the distance sensor of each of the communicating elements is selected from the group consisting of an acoustic sensor and an optical sensor.

18. The method according to claim 1, wherein an origin of the preset coordinate system is attached to the container.

19. The method according to claim 1, wherein the data delivered by the communicating elements correspond to a behaviour of the communicating elements attached to the internal surface of the container in the preset coordinate system.

20. A system comprising:
  a plurality of communicating elements,
  an element for determining the location of the communicating elements relative to one another on an internal surface of a container mobile in a preset coordinate system, after the communicating elements have been randomly placed in the container and attached on the internal surface of the container, wherein each of the communicating elements is equipped with a distance sensor, wherein the distance sensors acquire data representing distances between the respective communicating element and the other communicating elements, and wherein the position of each of the communicating elements on the internal surface of the container is determined from a known geometry of the container and from data delivered by the communicating elements taking into account the data representing the distances between the communicating elements acquired by the sensors, and an element for tracking the location of the communicating elements in the preset coordinate system while the container is moving in the preset coordinate system.

21. The system according to claim 20, wherein the device comprises:
  at least one electronic object capable of interacting with the communicating elements;
  an element for determining the location of the electronic object relative to the communicating elements from data delivered by at least one of the communicating elements regarding interactions between the communicating elements and the electronic object in which the communicating element acquires data on the location of the electronic object relative to the communicating element; and
  an element for determining the location of the electronic object in the preset coordinate system from data delivered by the element for determining the location of the electronic object relative to the communicating elements.

22. A communicating element, comprising:
a sealed housing containing electronics,
a first face of the sealed housing being formed by a magnet,
a second face of the sealed housing, other than the first face, comprising an emitter and a receiver that are connected to the electronics, and
a distance sensor, wherein the distance sensor is configured to acquire data representing distances between the respective communicating elements and the other communicating elements, and wherein the communicating element is configured to deliver data taking into account a distance separating the communicating element from another communicating element attached to an internal surface of a container, to a system outside of the container configured for:
  determining the locations of the communicating elements relative to one another on the internal surface of the container from the known geometry of the container and from data delivered by the communicating element taking into account the distance separating the communicating element from another communicating element attached to the internal surface of the container, and
  determining the location of each communicating element in a preset coordinate system when a container on an internal surface of which the at least one communicating element is placed is moving in the preset coordinate system.

23. A set of communicating elements, wherein the set comprises:
  at least two communicating elements according to claim 22,
  wherein each of the communicating elements is configured to deliver data on a distance separating the communicating element from the other communicating element or elements attached to the internal surface of the container.

* * * * *